United States Patent [19]
Head

[11] Patent Number: 6,062,265
[45] Date of Patent: May 16, 2000

[54] CONDUIT AND CONTINUOUS COILED TUBING SYSTEM AND METHOD OF ASSEMBLY THEREOF

[76] Inventor: Philip Head, 178 Brent Crescent, Park Royal, London, NW 10 7XR, United Kingdom

[21] Appl. No.: 09/168,009

[22] Filed: Oct. 7, 1998

[30] Foreign Application Priority Data

Oct. 30, 1997 [GB] United Kingdom ............. 9722935

[51] Int. Cl.⁷ ..................................... F16L 9/18
[52] U.S. Cl. ..................... 138/111; 138/113; 138/114
[58] Field of Search ................................ 138/111–114

[56] References Cited

U.S. PATENT DOCUMENTS

| | | | |
|---|---|---|---|
| 4,315,099 | 2/1982 | Gerardot et al. ............ | 174/47 |
| 4,394,531 | 7/1983 | Delabie ................... | 138/114 X |
| 4,451,966 | 6/1984 | Lee ....................... | 138/114 X |
| 4,585,059 | 4/1986 | Lee ....................... | 138/113 X |
| 4,590,652 | 5/1986 | Harwood .................. | 138/114 X |
| 4,615,359 | 10/1986 | Affa et al. ............... | 138/113 X |
| 5,435,351 | 7/1995 | Head ...................... | 138/111 |
| 5,907,134 | 5/1999 | Nording et al. ............ | 138/113 X |

*Primary Examiner*—Patrick Brinson
*Attorney, Agent, or Firm*—Herbert Dubno

[57] ABSTRACT

The invention relates to a conduit and coiled tubing system for deployment in a well, in which the conduit is arranged internally of the coiled tubing, and one end of the coiled tubing is attached to a powered device such as a motor or a drill which is to be installed in the well, and wherein the conduit is connected at one end to a power supply at the surface and connected at the opposite end to the powered device and wherein, in a locked state, the coiled tube comprises at least one protrusion extending inwardly from its internal wall and acts against the conduit or an anchoring surface provided thereon, to prevent axial movement of the conduit with respect to the coiled tubing at least on one direction. An anchoring collar may be provided on the tube against which the protrusions engage to secure the conduit in position inside the tube.

10 Claims, 9 Drawing Sheets

CONDUIT AND CONTINUOUS COILED TUBING SYSTEM AND METHOD OF ASSEMBLY THEREOF

FIELD OF THE INVENTION

This invention relates to a conduit and continuos coiled tubing system for operating and deploying a powered device in a well.

BACKGROUND OF THE INVENTION

Coiled or continuous reel tubing has been used in the oil industry for the last 20to 30 years. The fact that the tubing is a continuous single tube provides several advantages when entering a live oil or gas well which could have anything up to 7,000 psi well head pressure. This means the well does not have to be killed, (i.e. a heavy fluid does not have to be pumped down the production tubing to control the oil or gas producing zone by the effect of its greater hydrostatic pressure). Continuous tubing has the advantage of also being able to pass through the tubing through which the oil and/or gas is being produced disturbing the tubing in place.

Since its introduction, the uses and applications for coiled tubing have grown immensely, and now, rather than just being used to circulate various fluids in a well bore, it is not uncommon for coiled tubing to be used for conveying various hydraulically powered tools and more recently electrically powered tools on its end into the well. This has resulted in the insertion of conventional electrical wire-line logging cables or small hydraulic conduits being inserted into the inside of the reel of tubing so that these more sophisticated tools services can be performed.

A disadvantage which has resulted from this practice is the capstan effect of the smaller diameter wire-line or hydraulic tube tending to be pulled very tightly to the inner surface of the continuous reel of tubing. It will be appreciated that the wire line or small hydraulic conductor will have a slightly smaller pitch circle diameter that of the larger reeled tubing. The consequence of this is that for each complete 360 degrees the wire-line or hydraulic tube will be slightly shorter in length than the larger reeled tubing. If this difference is added up over its total length of 12,000 ft (3657 m) or usually longer the difference in lengths could be as much as 200 ft (61 m).

This problem has been recognized due to the operational problems encountered. Either one end of the wire-line or hydraulic tube is pulled out of its connection, or else the reeled tubing itself form a low frequency wave form caused by the tension in the conduit inside the reeled tubing, which prevents the reeled tubing from being lowered deeply into the well without the risk of damaging it.

Another disadvantage with using traditional wire-line inside reeled tubing is that it is not compatible with many of the fluids pumped through the reeled tubing, the more common ones being corrosive stimulation fluids, and cement slurries used generally for zonal isolation. The reason for this, is that wire line has two outer reinforcing layers of braided wire beneath which is an insulation layer protecting the conductors, which typically number up to eight. The normal insulation material is not compatible with the acid systems. Some expensive materials are available, but the total price then becomes prohibitively expensive. In addition, when cement slurries are pumped, the deposits of the cement slurry. When set, these deposits either make it difficult some deposits of the cement slurry, which, when set, either make it difficult for the wire-line to bend or, more commonly, the particles of set cement break off leaving residue inside the reel.

This has the effect of increasing the weight of the conduit and for conduits having a certain length the conduit is prone to stretching or creep when installed in the well particularly when is intended to the conduit is intended to remain in position for a relatively long period of time for production of the well. The type of conduit for which stretching is a problem depends upon the weight per unit length of the conduit, the material of the conduit and the expected working life of the conduit as well as the nature of the immediate environment surrounding the conduit, although in many applications the invention enables the conduit to be installed in coiled tubing with a dielectric oil between them. Nevertheless stretching of the conduit is frequently a serious problem.

OBJECT OF THE INVENTION

It is an object of the present invention to provide a conduit, coiled tubing system which avoids this problem of stretching and overcomes the other disadvantages of presently known systems as mentioned above.

SUMMARY OF THE INVENTION

According to the invention there is provided a conduit and coiled tubing system for deployment in a well, in which the conduit is arranged internally of the coiled tubing which comprises an internal wall having an internal diameter, and one end of the coiled tubing is attached to a powered device such as a motor or a drill which is to be installed in the well, and wherein the conduit is connected at one end to a power supply at the surface and connected at the opposite end to the powered device wherein the coiled tube comprises at least one protrusion extending inwardly from its internal wall which engages the conduit or an engaging surface arranged thereon to prevent axial movement of the conduit with respect to the coiled tubing at least in one direction.

The at least one protrusion is preferably formed by deformation of the wall of the coiled tube from the outside by suitable cold forming means which deforms the wall of the coiled tubing inwardly to form the protrusion. The deformation may be in the form of a plurality of circular shaped dimples arranged circumferentially around the coiled tubing at the desired position, typically three such dimples would be desirable, or alternatively a continuous deformation could be provided around the entire circumference of the coiled tube at the desired position.

The length of the conduit may exceed the length of the tube the excess of conduit causing the conduit to form at least one curve or wave within the tube the excess length of conduit may cause a curve to be formed in the conduit in between the anchoring collars.

According to the invention there is provided a method of providing a conduit and coiled tubing system comprising a conduit and a continuous coilable tube comprising a wall having internal and external surfaces thereof. The conduit in the unexpanded state is installed inside the tubing by any suitable means such as pumping or using a piston and tow line. When the conduit is installed in the desired position at least one protruding means is produced on the internal surface of the wall of the tube by deformation of the outside surface of the tube, to engage the conduit and thus prevent relative lateral movement between the conduit and the tube in at least one direction.

Preferably the conduit, which may be provided the collars fixedly attached thereto, is pre-installed inside the coiled tubing and the outside surface of the tube is then deformed in the desired positions to fix the conduit in position. Then the conduit and coiled tubing is attached to the powered tool at the surface and the system lowered down the well together to the desired location.

BRIEF DESCRIPTION OF THE DRAWINGS

The following is a more detailed description of some embodiments of the invention by way of example, reference being made to the accompanying drawings, in which.

DETAILED DESCRIPTION OF THE PREFERRED EMBODIMENTS

Figure 1:
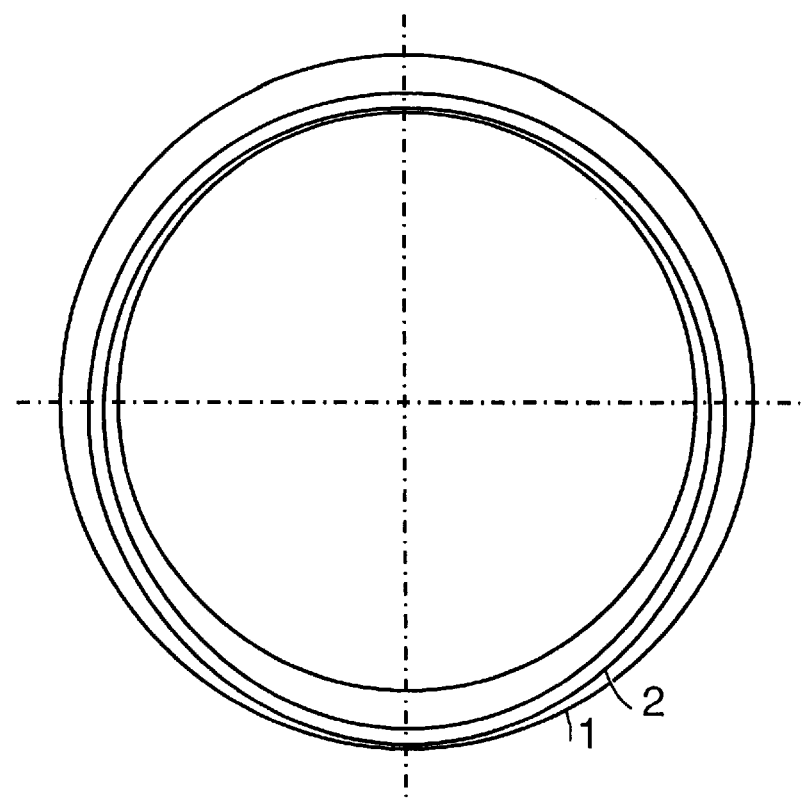
FIG. 1 is a diagram matic section, from the side, of a coiled tubing reel showing a conduit lying inside it on its inner surface.

Referring first to FIG. 1, there is shown a side cross-sectional view of one wrap of coiled tubing 1, with a conduit 2, lying on the inside wall 3 of the coiled tubing. A dotted line shows the diameter center line of the coiled tubing 1 while a second dotted line shows the diameter centre line of the conduit 2. It will be appreciated that because they have different center line diameters, their lengths per wrap will be slightly different with the coiled tubing being slightly longer. Multiplying this difference in length by the total number of wraps enables the difference in overall length to be determined, which can be in excess of 100 ft (30 m).

Figure 2:
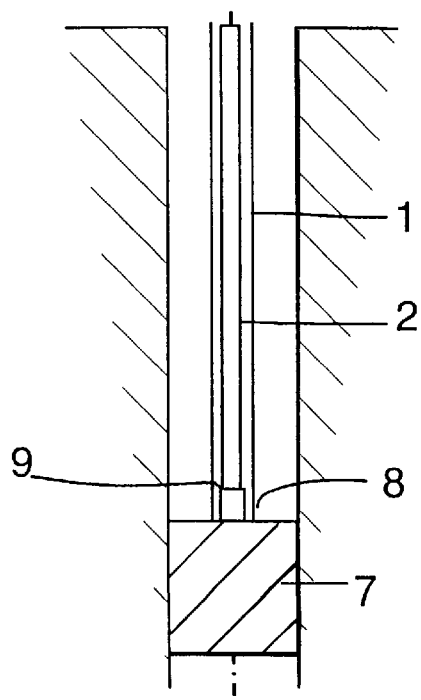
FIG. 2 is a section which shows the conduit and coiled tubing system installed in a well.
Figure 3:
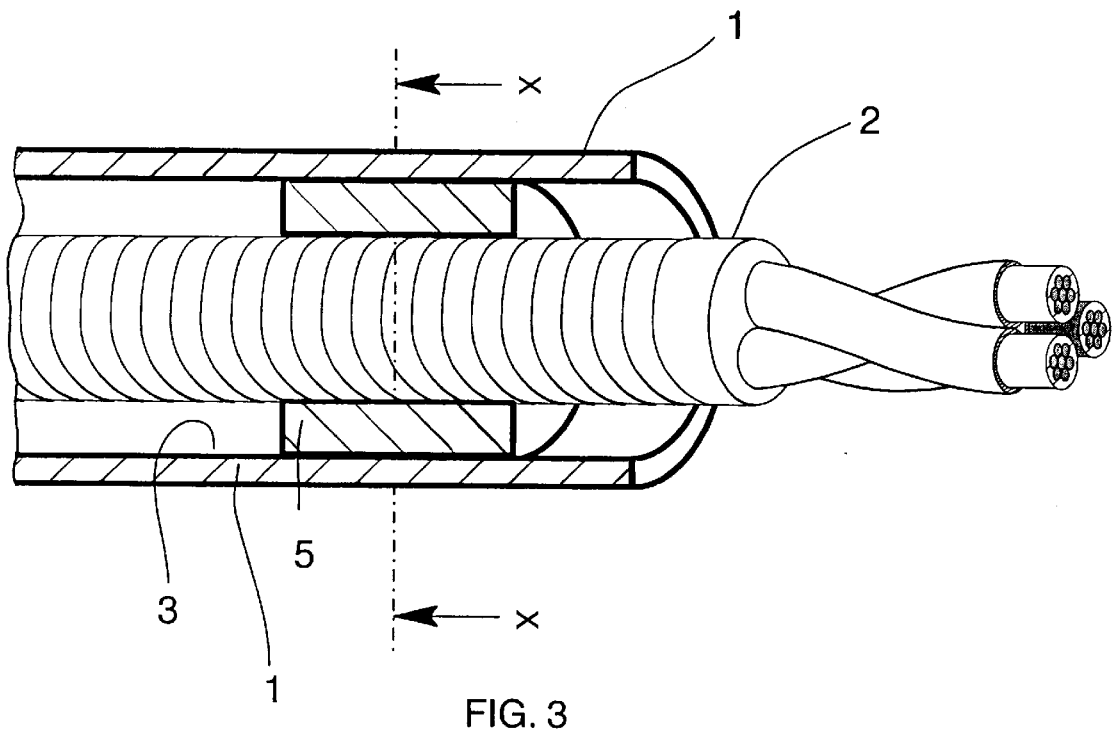
FIG. 3 is a perspective view which shows a longitudinal part section through the tubing and conduit according to the invention.
Figure 4:
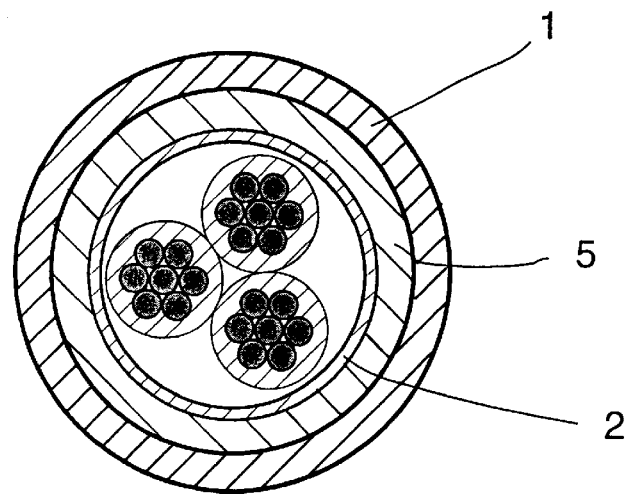
FIG. 4 is a transverse cross section along line X—X of FIG. 3.

Referring to FIGS. 1 and 2 the general arranged FIGS. 1 and 2 show the general arrangement of the conduit 2 and the coiled tubing 1 connected to a powered a device 7 which is deployed in a well, in which the conduit is arranged internally of the coiled tubing which comprises a wall and an internal bore, and one end of the coiled tubing 1 is attached to the powered device by a first attaching means 8 arranged between the wall of the coiled tubing 1 and the powered device 7. The powered device 7 may be a pump or a drill or other down-hole powered machine.

The conduit 2 is connected at one end (the upper end in the installed position shown in FIG. 1) to a power supply at the surface and connected at the opposite end to the powered device 7 by a first connection means 9 which is located within the wall of the coiled tubing 1 and within the first attaching means 8 so that the conduit 2 is prevented from contact with the outside of the coiled tubing 1 at all times.

The conduit may be pre-installed inside the coiled tubing and attached to the powered tool at the surface and the system lowered down the well together to the desired location.

In FIGS. 3 to 9 a conduit and coiled tubing system for deployment in a well is shown in which the conduit 2 is arranged internally of the coiled tubing 1 which comprises an internal wall 3 having an internal diameter. The conduit comprises a collar 10 which is fixedly attached to the 25 conduit 5 and has an outside diameter which is small enough for the conduit to be installed in the tubing. A plurality of such collars will be provided along the length of the conduit which are sufficient in number to secure the conduit to the tubing and support the weight of the conduit to prevent slipping or stretching of the conduit under its own weight.

Figure 5:
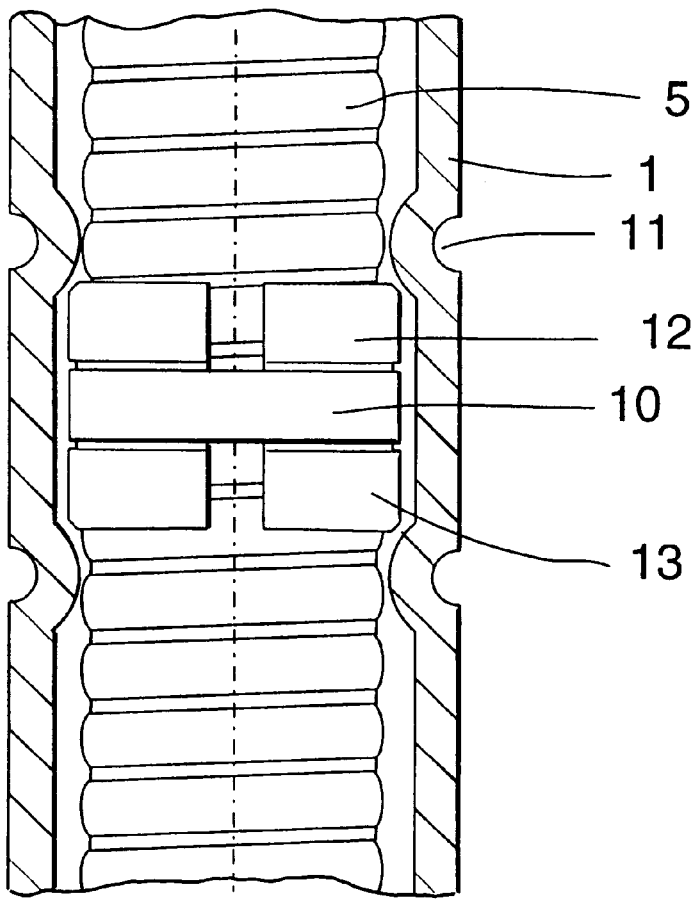
FIG. 5 is a longitudinal section through the tubing showing a first embodiment of the invention in the locked state.
Figure 6:
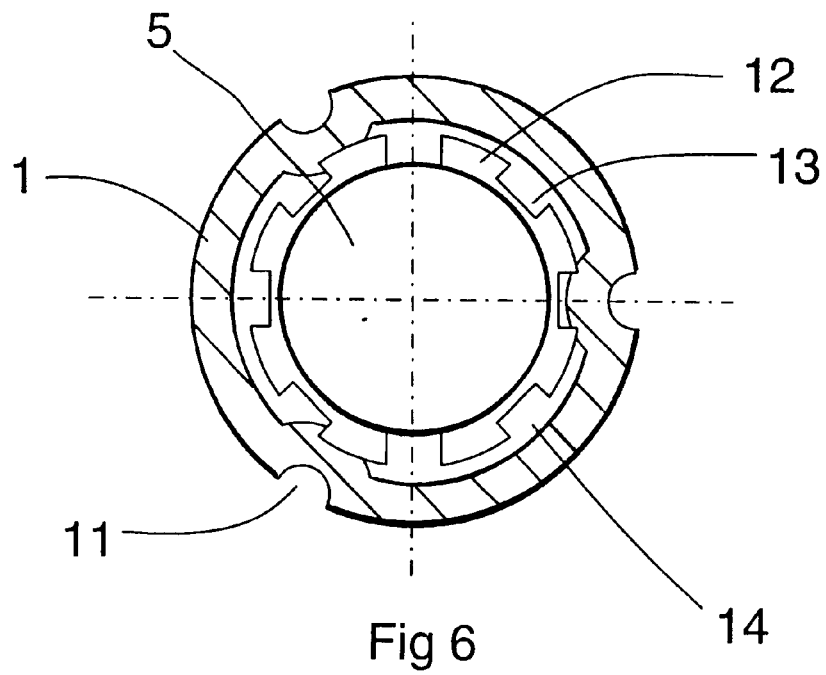
FIG. 6 is a transverse cross section of the tubing of the first embodiment in the locked state.

In the embodiment shown in FIGS. 5 and 6 the conduit is shown in the locked state when it has been located in the desired position and locked thereto by dimpling deformation of the outside surface of the wall of the coilable tube. Three dimples 11 are provided at 120 degree intervals around the circumference of the tube although it will be appreciated that more could be provided if greater security was required. Two sets of dimples are provided one on each side of the collar 8 in order to prevent movement of the collar in either the forwards or rearward directions along the tube 1. This will be advantageous in multi-directional drilling where it could be possible that horizontal drilling is carried out or even drilling at a slight upwards angle causing the weight of the conduit to act in the opposite direction. Also in this embodiment the collar provided is made from magnesium so that by passing a suitable solvent down the annular space 6 of the tube 1 the collar can be dissolved which will enable the conduit to be subsequently removed from the tube 1.

The dimples can be formed in the wall of the tube 1 by any known method for example by screwing in an indentation punch connected by a screw thread into a support clamp attached to the tube.

The collars 10 provide an anchoring surface against which the indentations or protrusions engage thus supporting the conduit. The anchoring collar 10 of this embodiment comprises a central support 13 and elongate tongues 12 extending axially on the outside of the central support with axial grooves 14 provided between the tongues 12. By means of this arrangement the grooves permit a fast flow rate of fluid between the inside wall of the tube 1 and the conduit 5 during installation of the conduit in the coiled tubing which greatly improves the speed of installation and in subsequent use. At the same time the tongues can be arranged to be sufficiently close to the inside wall of the tube 1 to enable them to be engaged by protrusions 11 without excessive deformation of the wall of the tube so that the tub is not unduly weakened by the deformation.

Figure 7:
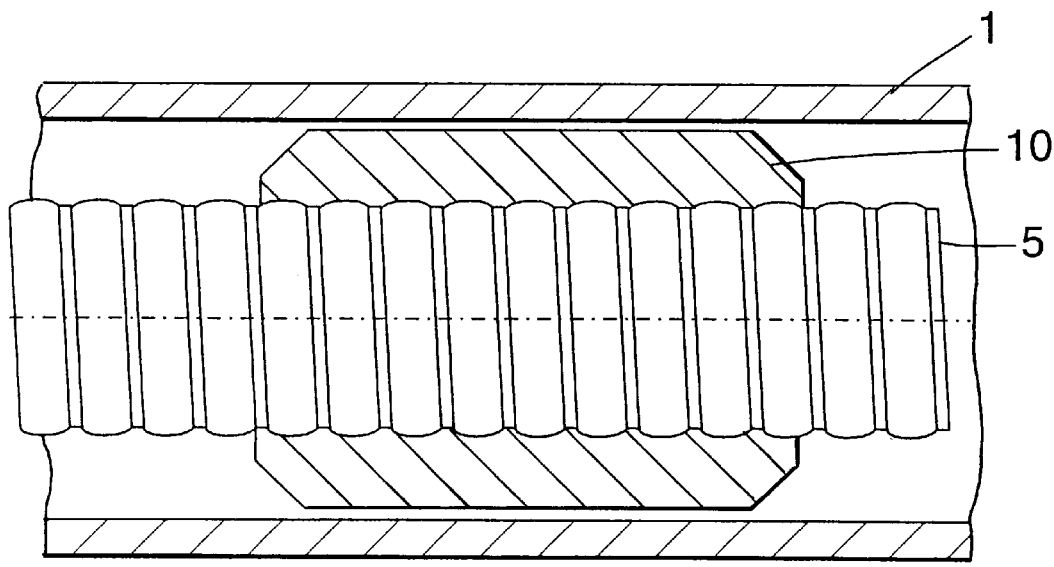
FIG. 7 shows a longitudinal section through the tubing showing a second embodiment of the invention with the conduit in the movable state.
Figure 8:
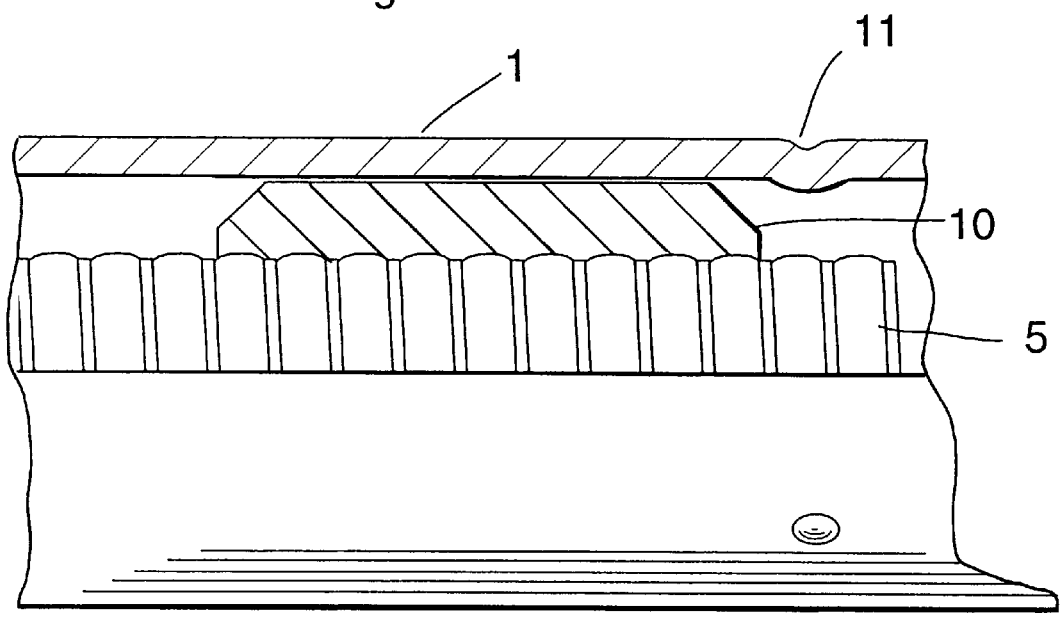
FIG. 8 is a longitudinal section through the tubing showing the second embodiment of the invention with the conduit in the locked state.

FIGS. 7 and 8 a further embodiment is shown in which the protrusion from the internal wall of the tube 1 is provided by a three dimpled indentations 11 provided around the outside of the circumference of the wall of the tube 1 at the lower end only of the anchoring collar 10. There may be any number of indentations or alternatively a continuous annular indentation around the complete circumference of the tube. Such a continuous indentation can be provided by, for example, a known rotary indenting tool acting against and deforming the outside of the tube. In this embodiment the indentation is only provided on one side of the collar 10 and therefore the conduit is only prevented from moving in one direction.

Figure 9:
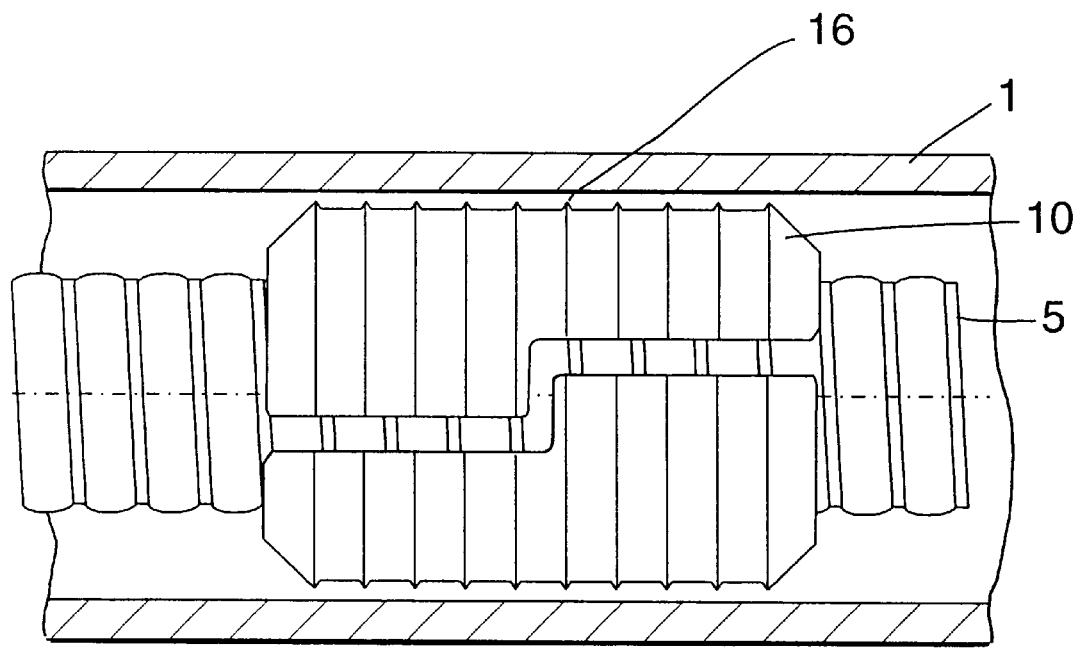
FIG. 9 is a longitudinal section through the tubing showing a third embodiment of the invention with the conduit in the movable state.
Figure 10:
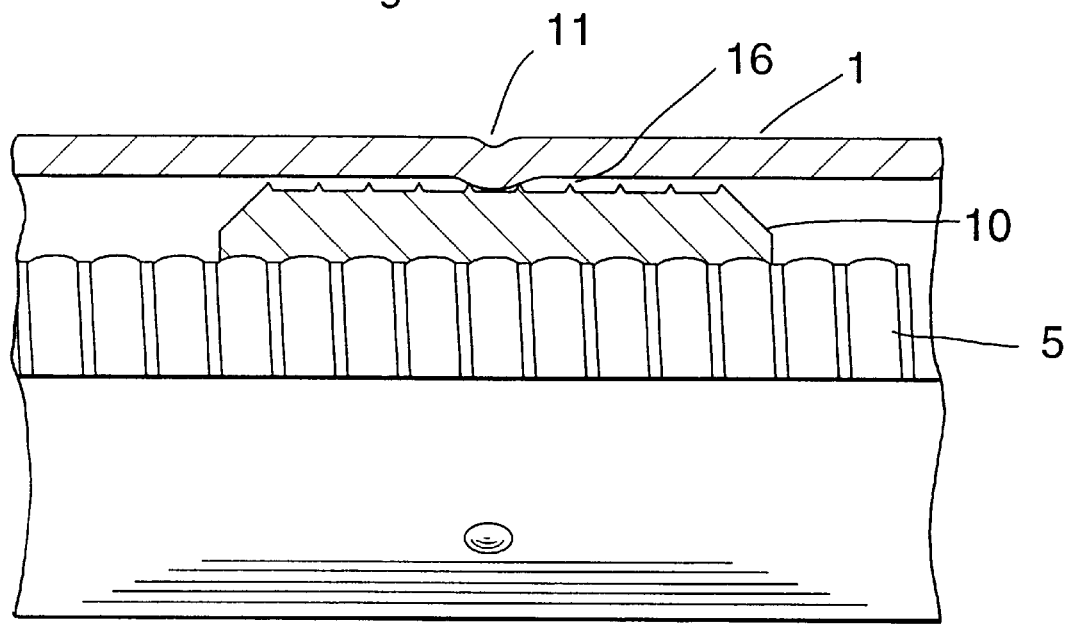
FIG. 10 is a longitudinal section through the tubing showing the third embodiment of the invention with the conduit in the locked state.
Figure 9A:
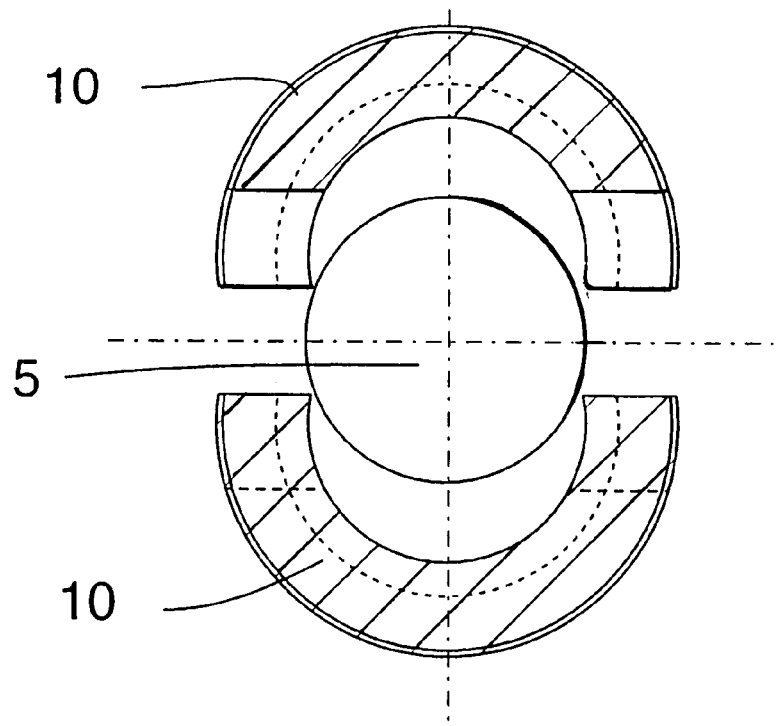
FIG. 9a is a transverse cross sectional view through the conduit and anchor before engagement of the anchor on the conduit.
Figure 9B:
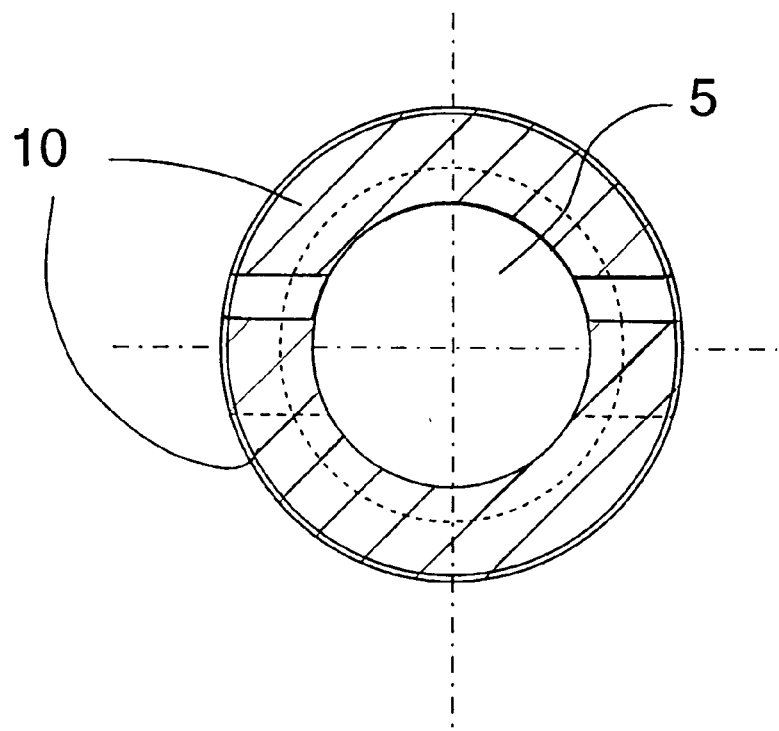
FIG. 9b is a cross transverse sectional view through the conduit and anchor after engagement of the anchor on the conduit.

A further embodiment is shown in FIGS. 9 and 10. In this embodiment the collar is provided with a series of radially arranged ribs 16 on its outer surface which are spaced apart by a distance which corresponds approximately to the width of an indentation in the wall of the tube. Thus when the indentation is provided in the wall of the tube to lock the anchoring collar, a single indentation locks the collar and the corresponding conduit in both directions. Thus only one indentation is required per anchoring anchor to lock the conduit in both directions. Compared to the embodiment of FIGS. 7 and 8 the indentation acts against the collar itself rather than against the annular space in front of or behind the collar which makes the formation of the indentation much easier because the collar acts as a reacting support for the indentation tool.

Figure 11:
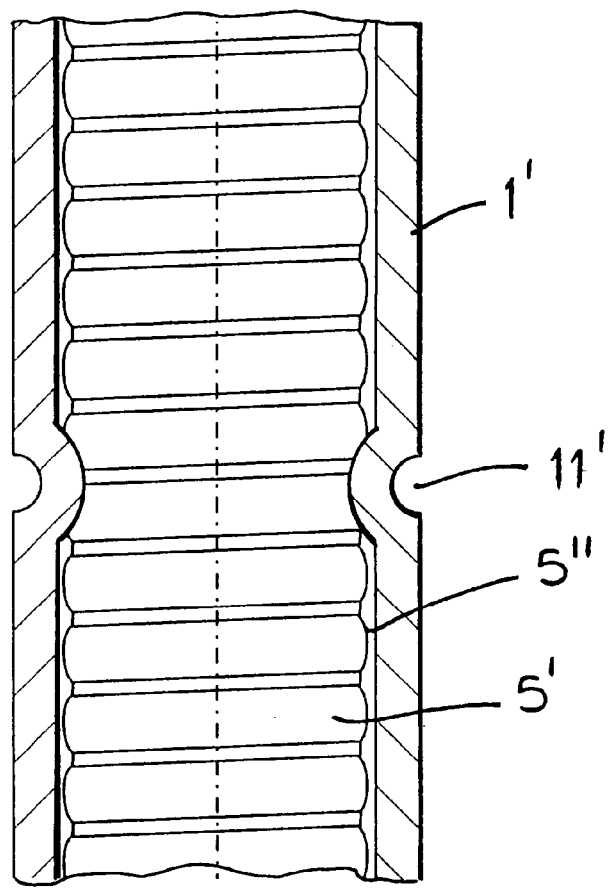
FIG. 11 is a longitudinal view of a further embodiment of the invention.
Figure 12:
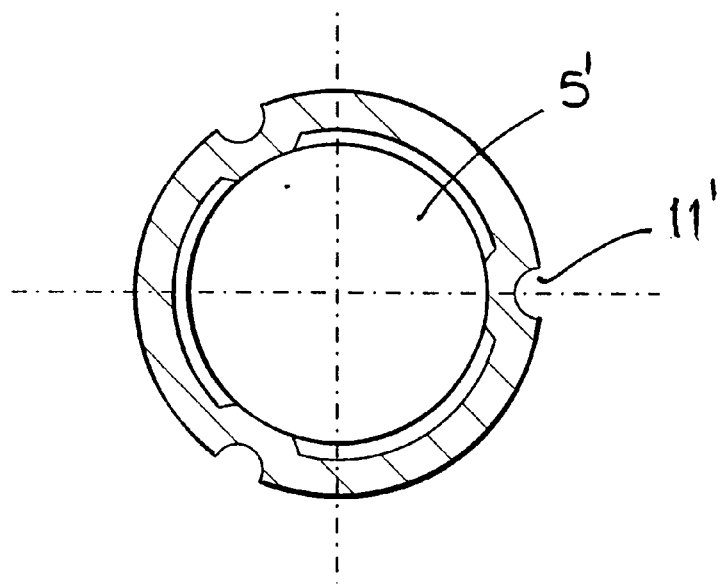
FIG. 12 is a transverse cross sectional view through FIG. 11.

In FIGS. 11 and 12 a further embodiment is shown in which the indentations are provided on the outside of the tube 1' and act directly against the conduit 5' thus fixing it in position. The conduit 5' comprises a outer shielding layer which comprises ribs 5" which engage against the deformed dimples 11'. Again the deformations 11' could also be in the form of a continuous annular trough shaped groove provided around the outside of the tube which produces a corresponding annular projection on the inside of the tube which acts against the conduit 5'. The conduit could also have a smooth outer surface which is gripped by the deformations 11' by friction or by deformation of the outer surface of the conduit 5' or a combination of these.

In a further embodiment of the invention for the embodiments comprising anchoring collars 10, the anchoring collars 10 are at least in part made of a material which may be subsequently dissolved by exposure to a suitable solvent provided between the conduit and the coiled tubing. Thus it would be preferable that the anchoring collars are made of a material such as magnesium which could be dissolved by a relatively weak acid such as acetic acid.

Figure 13:
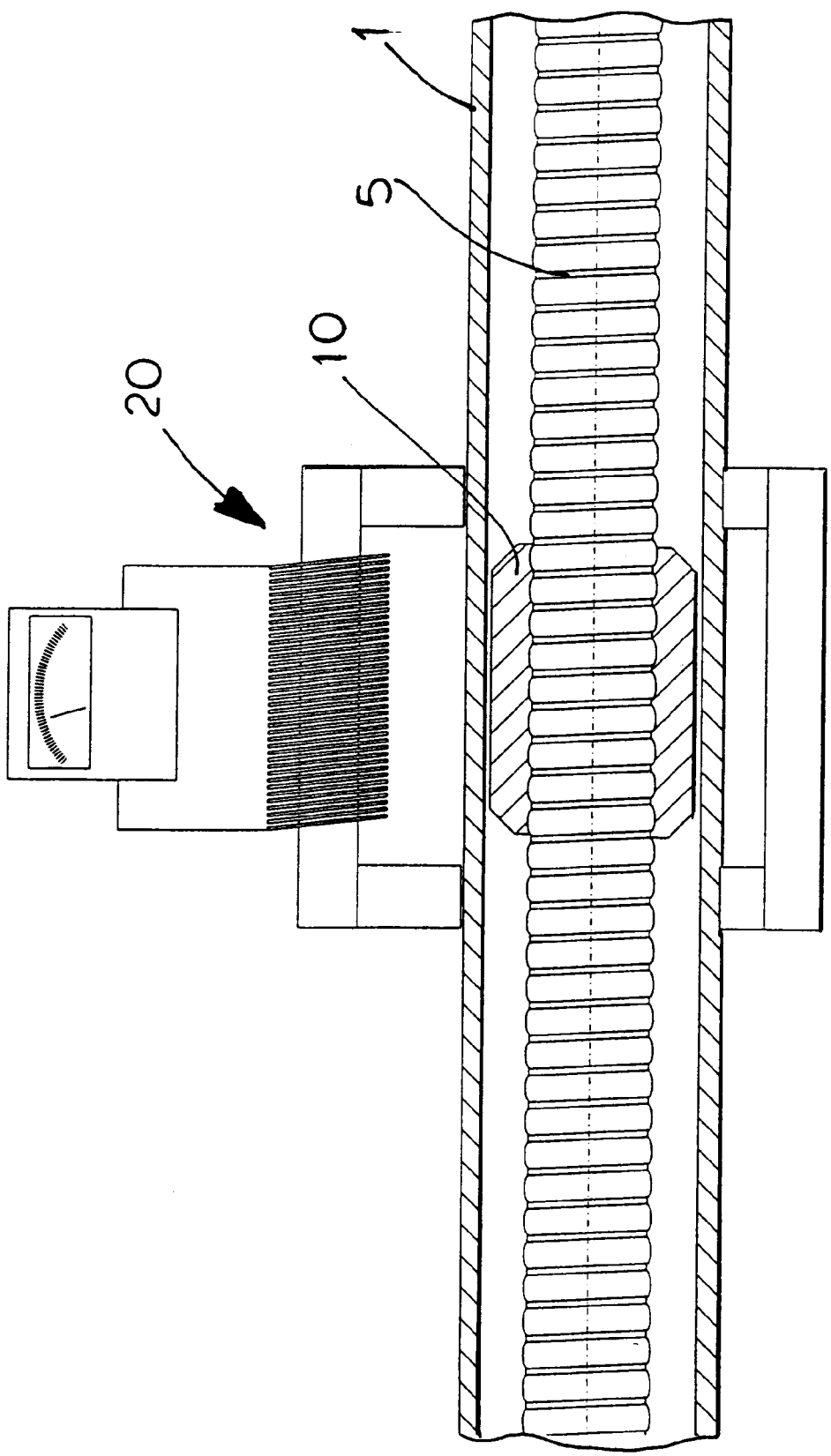
FIG. 13 is a side elevation of anchor detection means as used for embodiments of FIGS. 3 to 10.
Figure 14:
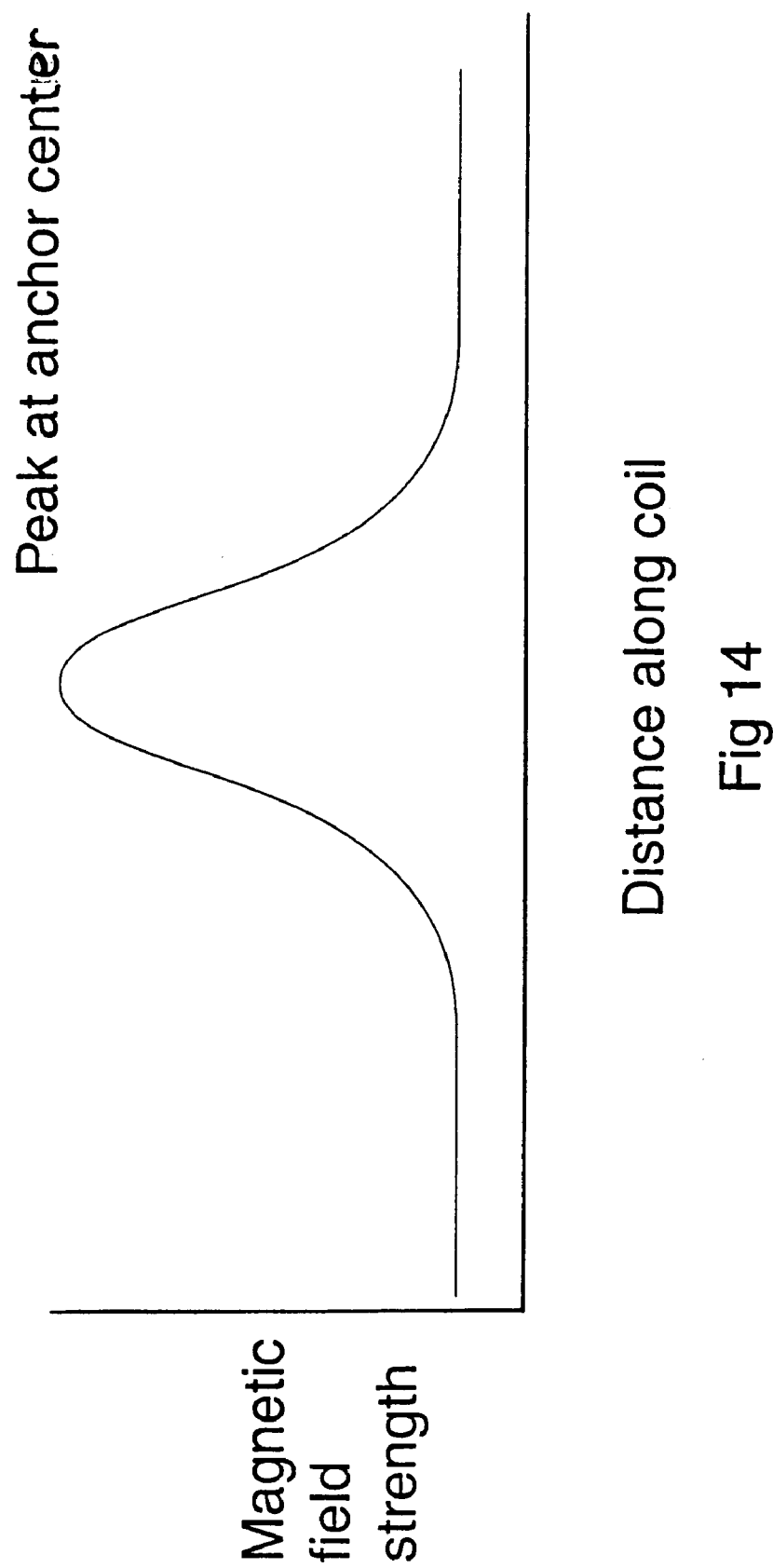
FIG. 14 is a graph of the reading of the detector of FIG. 13 as it passes by an anchor inside the tube.

FIGS. 13 and 14 show a means of detecting the location of the anchoring collars 10 from the outside of the tube 1 for the embodiments shown in FIGS. 3 to 9. It will be appreciated that as described above when the conduit has been installed inside the tube 1 it is then necessary to anchor it in position. Thus the indentations will have to be provided accurately on either side of the anchoring collars 10, or on the collars themselves in the case of the embodiment in FIG. 10. It will therefore be necessary to position the indenting means accurately on the tube. There is also provided by the invention detection means 20 for detecting the location of the collar inside the tube 1. This detection means 20 is preferably a magnetic fieldbased detection device which emits a magnetic field and detects the change in the field strength, an increase in which indicates the location of an anchoring collar 10. The detection means 20 may be provided as an integral part of the detenting means so that detection and indentation can take place in the same action and the detenting process can be carried out automatically.

In an embodiment of the detenting method it would be advantageous to carry out the detenting while the tube, with the conduit installed, is laid out horizontally, either completely, or a long section is laid out between two reels transferring the tubing In this case the indenting means, with the collar detection means arranged therewith if needed, can be arranged to run along the tube and provide indentation on one side of the tube only.

In an alternative method of indenting the indenting means, and the detection means if needed, could be provided around the tube and the tube passed through the indentation means. Thus the indentation cam be provided around the entire circumference of the tube. The indenting means could be provided at the end of a reel of coiled tubing and the indentation could be carried out as the tube is unreeled. This could be carried out as a procedure in the factory and the tube reeled back onto a further reel to provide a reeled tube with the conduit securely anchored inside, or alternatively the detenting could be carried out as the tube is unreeled at the required deployment located.

It will be appreciated that there may be other embodiments which fall within the scope of the invention which is defined by the following claims.

What is claimed is:

1. A conduit and coiled tubing system for deployment in a well, in which a conduit is arranged internally of a coiled tubing which comprises an internal wall having an internal diameter, and one end of the coiled tubing is attached to a powered device such as a motor or a drill which is to be installed in the well, and wherein the conduit is connectable at one end to a power supply at the surface and connected at the opposite end to the powered device and wherein, in a locked state, the coiled tube comprises at least one protrusion extending inwardly from its internal wall and acts against the conduit or an anchoring surface provided thereon, to prevent axial movement of the conduit with respect to the coiled tubing at least on one direction.

2. A conduit and coiled tube system according to claim 1, wherein said least one protrusion is formed by deformation of the wall of the coiled tube from the outside by cold forming means which deforms the wall of the coiled tubing inwardly to form the at least one protrusion.

3. A conduit and coiled tube system according to claim 1 wherein said at least one protrusion is in the form of a plurality of circular-shaped dimples arranged circumferentially around the coiled tubing at the desired position.

4. A conduit and coiled tube system according to claim 3, wherein three such dimples are provided.

5. A conduit and coiled tube system according to claim 1, wherein the at least one protrusion is in the form of a continuous deformation provided around the entire circumference of the coiled tube at a desired position.

6. A conduit and coiled tube system according to claim 1, wherein said conduit comprises at least one collar arranged co-axially around the conduit providing an anchoring surface for the at least one protrusion.

7. A conduit and coiled tube system according to claim 1, wherein said at least one collar comprises at least two radial ribs arranged on its outside surface between which the at least one protrusion engages in the locked state.

8. A conduit and coiled tube system according to claim 1 wherein the length of the conduit exceeds the length of the tube, an excess of length of the conduit causing the conduit to form at least one curve or wave within the tube between two anchoring collars on the conduit.

9. A conduit and coiled tubing system according to claim 6, wherein said at least one anchoring collar is at least in part made of a material which can be subsequently dissolved by exposure to a suitable solvent provided between the conduit and the coiled tubing.

10. A method of providing a conduit and coiled tubing system comprising a conduit having a continuous coilable tube comprising a wall having internal and external surfaces thereof, wherein the conduit in an unexpanded state is installed inside the tubing, and when installed in a desired position at least one protruding means is produced on the internal surface of the wall of the tube by deformation of the external surface of the wall, to engage the conduit or an engaging surface arranged thereon and thus prevent relative lateral movement between the conduit and the tube in at least one direction, wherein the conduit being provided with collars fixedly attached thereto and being pre-installed inside the coiled tubing and the outside surface of the tube is then deformed in desired positions to fix the conduit in position and then the conduit and coiled tubing is attached to a powered tool at the surface and the system lowered down the well together to a desired location.

* * * * *